United States Patent
Cuppett et al.

(10) Patent No.: US 7,272,611 B1
(45) Date of Patent: Sep. 18, 2007

(54) APPARATUS AND METHOD FOR SEARCHING A N-BRANCH DATA STRUCTURE USING INFORMATION IN ENTRIES

(75) Inventors: Jeff Cuppett, Los Altos, CA (US); Reynold Leong, San Jose, CA (US)

(73) Assignee: Network Appliance, Inc., Sunnyvale, CA (US)

(*) Notice: Subject to any disclaimer, the term of this patent is extended or adjusted under 35 U.S.C. 154(b) by 553 days.

(21) Appl. No.: 10/690,244

(22) Filed: Oct. 20, 2003

Related U.S. Application Data

(60) Provisional application No. 60/422,109, filed on Oct. 28, 2002.

(51) Int. Cl.
G06F 17/30 (2006.01)

(52) U.S. Cl. .................. 707/101; 707/102; 707/3; 370/392

(58) Field of Classification Search .............. 707/1–10, 707/100–104.1, 200–206; 370/392, 389, 370/412
See application file for complete search history.

(56) References Cited

U.S. PATENT DOCUMENTS

| | | | |
|---|---|---|---|
| 5,682,537 A | 10/1997 | Davies et al. | |
| 5,960,434 A * | 9/1999 | Schimmel | 707/100 |
| 6,084,877 A * | 7/2000 | Egbert et al. | 370/389 |
| 6,233,242 B1 * | 5/2001 | Mayer et al. | 370/412 |
| 6,249,521 B1 * | 6/2001 | Kerstein | 370/389 |
| 6,343,339 B1 | 1/2002 | Daynes | |
| 6,721,320 B1 * | 4/2004 | Hoglund et al. | 370/392 |
| 6,757,769 B1 | 6/2004 | Ofer | |
| 6,915,296 B2 * | 7/2005 | Parson | 707/4 |
| 6,965,893 B1 | 11/2005 | Chan et al. | |
| 7,069,268 B1 * | 6/2006 | Burns et al. | 707/10 |
| 2003/0084268 A1 | 5/2003 | Mashlma | |
| 2004/0006572 A1 | 1/2004 | Hoshino et al. | |
| 2004/0068607 A1 | 4/2004 | Narad | |
| 2004/0199734 A1 | 10/2004 | Rajamani et al. | |

* cited by examiner

Primary Examiner—Jeffrey Gaffin
Assistant Examiner—Yicun Wu
(74) Attorney, Agent, or Firm—Wiesnor and Associate; Leland Wiesnor

(57) ABSTRACT

Techniques for searching a data structure using information in entries found in the data structure are provided. A key is determined for an entry in a data structure and an entry for that key is accessed. It is determined if that entry is the correct entry for the key. If not, information in the entry is used to determine a second entry for the key. It is then determined if the second entry is the correct entry for the key. If not, the process continues as described above until the correct entry is found.

24 Claims, 7 Drawing Sheets

APPARATUS AND METHOD FOR SEARCHING A N-BRANCH DATA STRUCTURE USING INFORMATION IN ENTRIES

CROSS-REFERENCES TO RELATED APPLICATIONS

This application is a non-provisional application of and claims the benefit of U.S. Provisional Application No. 60/422,109, filed on Oct. 28, 2002, which is incorporated by reference in its entirety for all purposes.

BACKGROUND OF THE INVENTION

The present invention generally relates to searching and more specifically to techniques for searching a data structure where entries in the data structure include information that guides a search.

A key is used to search a data structure for a certain value. When a key is large, searching for the key in the data structure may be inefficient and time consuming. Often, the key is hashed into a hash result using a hashing algorithm. The hash result is typically a smaller representation of the key and can be searched for in less time than the larger key.

Because keys are hashed into smaller hash results, multiple hash results may correspond to a single entry in the data structure. Thus, when an entry corresponding to the hash result is determined, the entry may not be the correct entry for the key. If the entry is not the correct entry for the key, a search for a different entry needs to be performed.

The entry that was determined may include multiple branches. Each branch may include an entry that is the correct entry for the key and each branch is searched for the hash result. Searching for the hash result in each branch includes many disadvantages. For example, the time to search each branch is very time consuming and inefficient. Thus, search times increase as data structures become more complicated and include more branches.

BRIEF SUMMARY OF THE INVENTION

Embodiments of the present invention generally relate to searching a data structure using information in entries found in the data structure. A hash result is determined and an entry in a data structure for the hash result is accessed. It is determined if that entry is the correct entry for the hash result. If not, information in the entry is used to determine a second entry for the key. It is then determined if the second entry is the correct entry for the hash result. If not, the process continues as described above until the correct entry is found.

In one embodiment, a method for searching for an entry in a plurality of entries in a data structure is provided. The method comprises: determining an entry point for the data structure; determining a first entry in the plurality of entries corresponding to the entry point; determining if the first entry corresponds to a key used to determine the entry point; if the first entry does not correspond to the key, using information in the first entry to determine a second entry in the data structure for the key; and if the first entry corresponds to the key, performing an action associated with the first entry.

In another embodiment, a method for searching a data structure is provided. The method comprises: hashing a search key to generate a hash result; determining a first entry in a plurality of entries in the data structure using the hash result; determining if the first entry corresponds to the search key; if the first entry does not correspond to the search key, using information in the first entry to determine a second entry in the data structure, the second entry included in a branch one or more branches associated with the first entry; and if the first entry does correspond to the search key, performing an action associated with the first entry.

In yet another embodiment, a method for searching a data structure is provided. The method comprises: (a) hashing a search key to generate a hash result; (b) determining an entry in a plurality of entries in the data structure using the hash result; (c) determining if an entry key in the entry corresponds to the search key; (d) if the entry key does not correspond to the search key, repeating step (c) using a subsequent entry until the entry key from the subsequent entry corresponds to the search key, wherein the subsequent entry is determined using information in the entry; and (e) if the entry key does correspond to the search key, performing an action associated with the entry.

In another embodiment, a method for searching for an entry in a plurality of entries in a data structure is provided. The method comprises: receiving a data frame from a storage network; determining a search key for the data structure using information in the data frame; hashing the search key to generate a hash result; determining a first entry in the plurality of entries corresponding to the hash result; determining if the first entry corresponds to the search key; if the first entry does not correspond to the search key, using information in the first entry to determine a second entry in the data structure; and if the first entry corresponds to the search key, retrieving an address for a storage device found in the first entry.

A further understanding of the nature and the advantages of the inventions disclosed herein may be realized by reference of the remaining portions of the specification and the attached drawings.

DETAILED DESCRIPTION OF THE INVENTION

Figure 1:
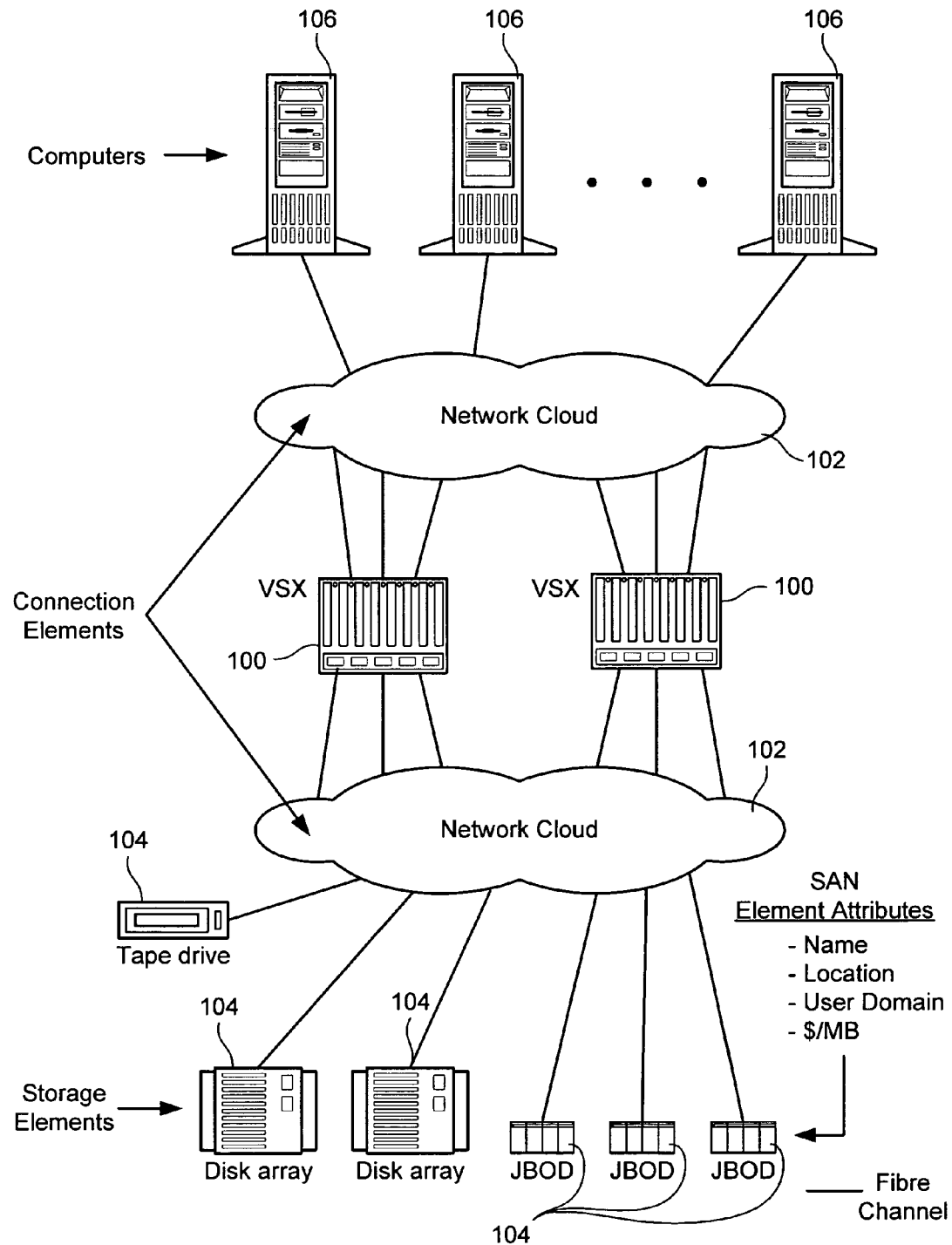
FIG. 1 shows a storage server (VSX) according to an embodiment of the present invention.

FIG. 1 shows a storage server (VSX) 100 according to an embodiment of the present invention. The figure also shows a storage area network (SAN) 102, a number of physical storage devices 104, and a number of host computers 106. The storage server 100 is also referred to as a Virtual Storage Exchange (VSX) and is further detailed in FIGS. 2A-2B.

The SAN 102 can be any type of computer network. It is referred to as a storage area network in the present application because that is its relevant function with respect to the embodiments of the present invention. In an embodiment of the present invention, the SAN 102 is a Fibre Channel network, the host computers 106 and the storage devices 102 are configured to communicate with the Fibre Channel network, and VSX 100 is also configured to communicate with the Fibre Channel network. Thus, VSX 100 can be easily added to an existing SAN.

The physical storage devices 104 include tape drives, disk arrays, JBODs ("just a bunch of disks"), or other types of data storage devices. The physical storage devices 104 can be connected directly to the host computers 106, can be connected directly to the host computers 106 via the SAN 102 or can be indirectly connected to the host computers 106 via the SAN 102 and VSX 100. In any case, SAN 102 is optional. In one embodiment of the present invention, management of storage virtualization is implemented by using VSX 100 to indirectly connect the storage devices 104 to the host computers 106.

The host computers 106 can be servers or stand-alone computers. The host computers 106 can be directly connected to the SAN 102 or indirectly connected via a switch, router, or other communication link.

Figure 2A:
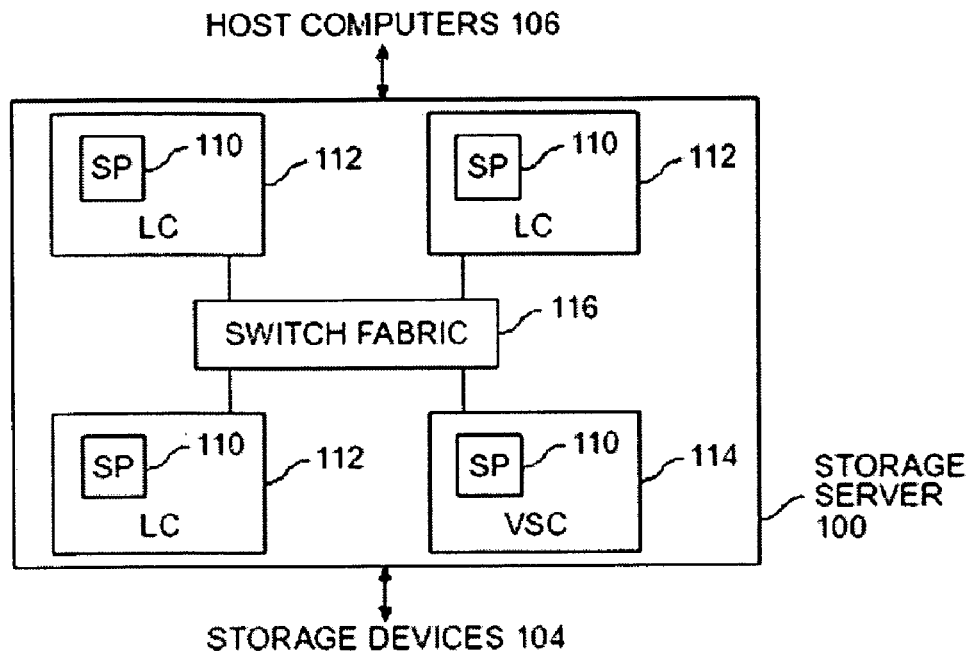
FIG. 2A is a Block diagram of VSX showing the hardware components related to embodiments of the present invention.

FIG. 2A is a Block diagram of VSX 100 showing the hardware components related to embodiments of the present invention, including a storage processor 110, a line card 112, a Virtual Storage Control card 114, and an internal switch fabric 116.

VSX 100 may include one or more storage processors 110. The storage processors 110 process the storage commands and data to be stored or retrieved as information flows between the host computers 106 and the storage devices 104. One or more of the storage processors 110 may be included on each line card 112. VSX 100 includes space for numerous line cards 112, so the capabilities of VSX 100 can be modularly increased by adding more line cards 112 or more storage processors 110. Each storage processor 110 is associated with one or more ports of VSX 100.

VSX 100 may include one or more Virtual Storage Control cards 114. The Virtual Storage Control cards control the operation of VSX 100 and control the line cards 112, which perform the actual work of transferring commands and data.

The switch fabric 116 connects the storage processors 110. The switch fabric switches information received at one internal port to another internal port of VSX 100. For example, when a host computer 106 wants to read data stored on the storage area network 102, its request is processed by the storage processor 110 associated with the port associated with that host computer 106. That storage processor 110 is referred to as the upstream storage processor 110. The upstream storage processor 110 communicates with a downstream storage processor 110 associated with the port associated with the storage device 104 storing the data to be read, via the switch fabric 116. Then the switch fabric 116 transfers the data read from the storage device to the host computer 106, via the downstream and upstream storage processors 110.

Figure 2B:
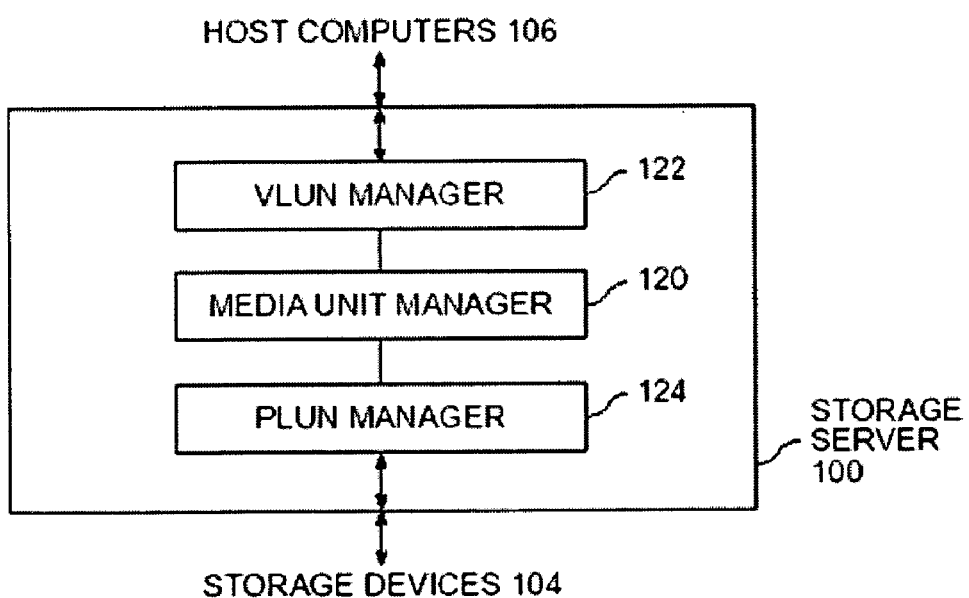
FIG. 2B is a Block diagram of VSX showing the functionality relevant to embodiments of the present invention.

FIG. 2B is a Block diagram of VSX 100 showing the functionality relevant to embodiments of the present invention. The functions of VSX 100 may be implemented by one or more processors that execute processing according to one or more computer programs, microcode segments, hardware structures, or combinations thereof. The functions relevant to the present invention are the media unit (MU) manager 120, the virtual logical unit (virtual LUN or VLUN) manager 122, and the physical logical unit (physical LUN or PLUN) manager 124.

The PLUN manager 124 manages data and command transfer to and from the storage devices 104. Each storage device 104 may have associated therewith a PLUN that is used for identifying each particular storage device 104.

The VLUN manager 122 manages data and command transfer to and from the host computers 106. Each host computer 106 may have access with one or more VLUNs. Each VLUN represents a virtual address space (e.g., gigabytes of storage) with defined attributes (e.g., performance parameters, reliability level, etc.). As such, each host computer 106 exchanges data and commands with VSX 100 with reference to a particular VLUN.

The MU manager 120 basically translates between VLUNs and PLUNs. The MU manager 120 is responsible for managing the address space of all the storage devices 104 (physical LUNs) connected to VSX 100. The MU manager 120 also manages the address space of the storage constructs built within VSX 100, including slices, concatenations, RAID0 (stripes) and RAID1 (mirrors).

The MU manager 120 uses an abstract Block-storage addressing technique that enables address spaces to be treated in a logical manner, regardless of the underlying storage constructs or physical LUNs. These logical address spaces can be combined together into more complex and feature rich storage constructs, which are also treated simply as abstract Block-storage address spaces.

These logical address spaces can be configured to appear as VLUNs on a multi-ported storage device. This process of presenting physical LUNs as logical address spaces on virtual devices is referred to as storage virtualization. Abstract Block-storage addressing is achieved via a data structure known as a media unit (MU).

Figure 3:
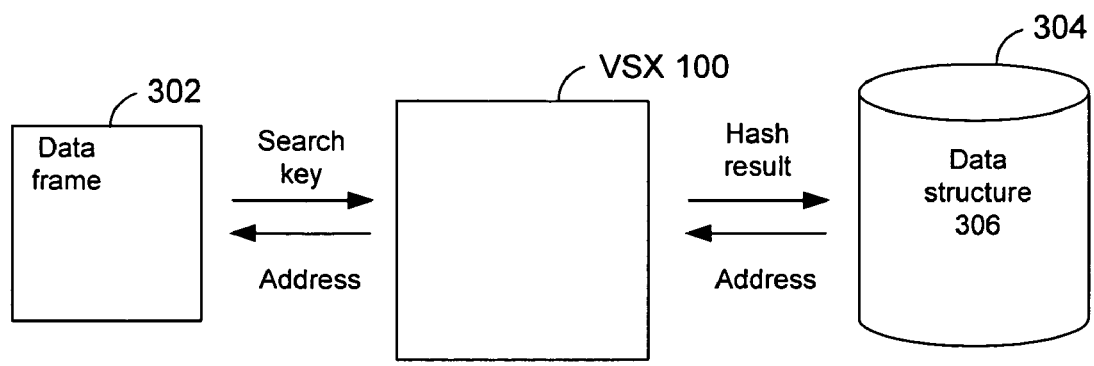
FIG. 3 depicts a simplified block diagram of a system for searching a data structure according to one embodiment of the present invention.

FIG. 3 depicts a simplified block diagram of a system 300 for searching a data structure 306 according to one embodiment of the present invention. System 300 includes one or more data frames 302, storage processor 110, and a database 304.

Storage processor 110 receives a data frame 302 and searches a data structure 306 in database 304 for information. In one embodiment, storage processor 110 searches data structure 306 to determine an address for a storage device 104. Although the following description will be described at searching for addresses of storage devices 104, it will be understood that the embodiments of the present invention are not restricted to searching for addresses of storage devices 104. For example, embodiments of the present invention may be used to search for any kind of information that is stored in a data structure.

Data frame 302 includes information that may be used to search data structure 306. In one embodiment, data frame 302 includes information that may be stored in a storage device 104. The address of the destination for data frame 302 was not found in data frame 302, however. Rather, the destination address may be retrieved from data structure 306 using a search key that is formed using information found in data frame 302.

In one embodiment, the search key corresponds to a location in data structure 306. Data structure 306 includes a plurality of entries associated with the search keys. In one embodiment, data structure 306 is a combination hash table linked list. The hash table linked list comprises a plurality of entries that correspond to hash keys. Each entry is linked to one another in the list. Although a hash table linked list is described, a person skilled in the art will appreciate other data structures 306 that may be used, such as any N-branch data structure.

Storage processor 110 uses the search key to determine an entry in data structure 306. In one embodiment, the search key is hashed using a hashing algorithm. For example, the search key is an 88-bit key that is hashed using a Cyclic Redundancy Check (CRC) 32-bit hashing algorithm into a 16-bit hash result. The hash result is then used to determine the first entry in data structure 306. Storage processor 110 then determines if the first entry is the correct entry for the search key. Because a search key is hashed into a smaller result, collisions may occur where multiple search keys are hashed into the same hash result. Thus, the multiple search keys may point to the same entry.

A verification process is performed to determine if the entry contains information for the search key. If the verification is positive, then the entry is the correct entry for the hash result; if the verification fails, then the entry is not the correct entry for the hash result. If the first entry is not the correct entry for data frame 302, storage processor 110 determines a second entry using information in the first entry. If the second entry is not the correct entry for data frame 302, the process continues as described above until the correct entry is found. When the correct entry is found, an address for storage device 104 that is found in the entry is returned to storage processor 110 and written to data frame 302.

Figure 4:
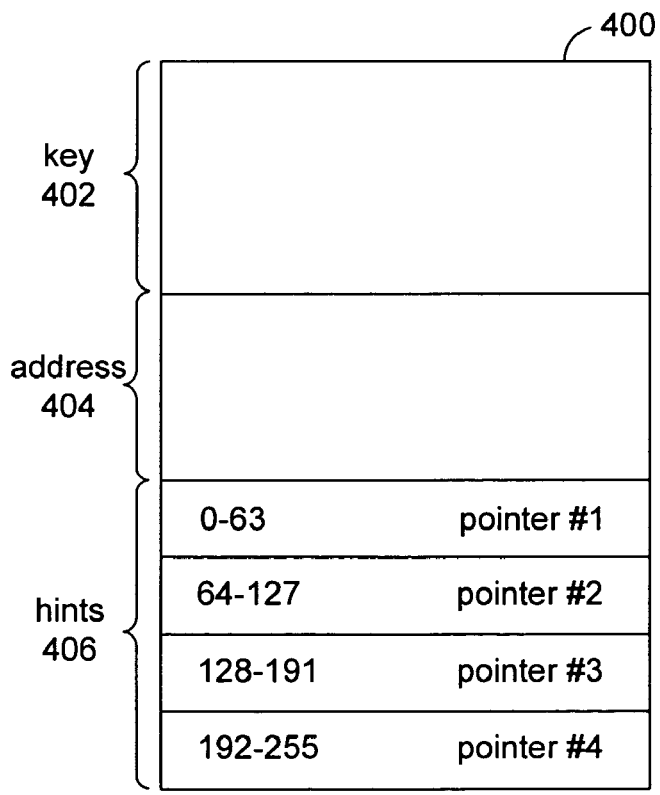
FIG. 4 illustrates an entry that may be found in the data structure according to one embodiment of the present invention.

FIG. 4 illustrates an entry 400 that may be found in data structure 306 according to one embodiment of the present invention. Entry 400 includes a key 402, an address 404, and hints 406.

Key 402 is the search key and is used to determine if entry 400 is the correct entry for the hash result. For example, key 402 corresponds to the search key associated with data frame 302 and is the unhashed key of the hash result that correctly corresponds to entry 400. In one embodiment, key 402 is the 88-bit key. Key 402 is compared with the search key associated with data frame 302 to determine if entry 400 is the correct entry for data frame 302. If key 402 matches the search key found in data frame 302, then entry 400 is the correct entry.

Address 404 includes information that may be used by storage processor 110. For example, address 404 may be the address for a storage device 104 where data frame 302 may be used to update, retrieve, or erase information. Additionally, address 404 may include any other information that is needed for data frame 302, such as protocol information, etc.

Hints 406 include information that is used to determine another entry to search for. For example, hints 406 include pointers that are used in the event of a collision when entry 400 is not the correct entry for data frame 302. Because larger keys are hashed into smaller results, the smaller results may collide because more than one search key may be associated with entry 400. If entry 400 is not the correct entry for data frame 302, another entry should be determined.

Hints 406 include information that is used by storage processor 110 to determine a branch in data structure 306 in which to search for another entry. In one embodiment, entry 400 includes an N-number of branches. The branches include child entries that may include an entry that corresponds to the search key. In another embodiment, hints 406 include information that points to another entry that should be accessed.

Hints 406 include criteria that are compared to information associated with the data frame 302. In one embodiment, hints 406 include a number of bits that are compared to at least a part of the search key associated with data frame 302. If information in the search key satisfies any of the criteria in one of the hints 406, a pointer associated with the satisfied hint 406 is determined. For example, hints 406 may range in value from 0 to 255. For example, one hint 406 for each of the ranges 0-63, 64-127, 128-191, and 192-255 is provided. If bits in the search key fall within one of the ranges, a pointer associated with the corresponding hint 406 is used.

In one embodiment, when a first entry 400 is not the correct entry, the eight least significant bits (LSBs) of the search key are used to select a hint 406. The eight LSBs will fall within one of the ranges described above. If a second collision occurs with a second entry 400, the search key is shifted 8 bits to the right and the eight LSBs are used again to determine the hints 406 for the next level of pointers. The process continues until a correct entry 400 is determined. In one embodiment, if the search key is 88 bits, a maximum data structure 306 of eleven levels of entries is possible.

Figure 5:
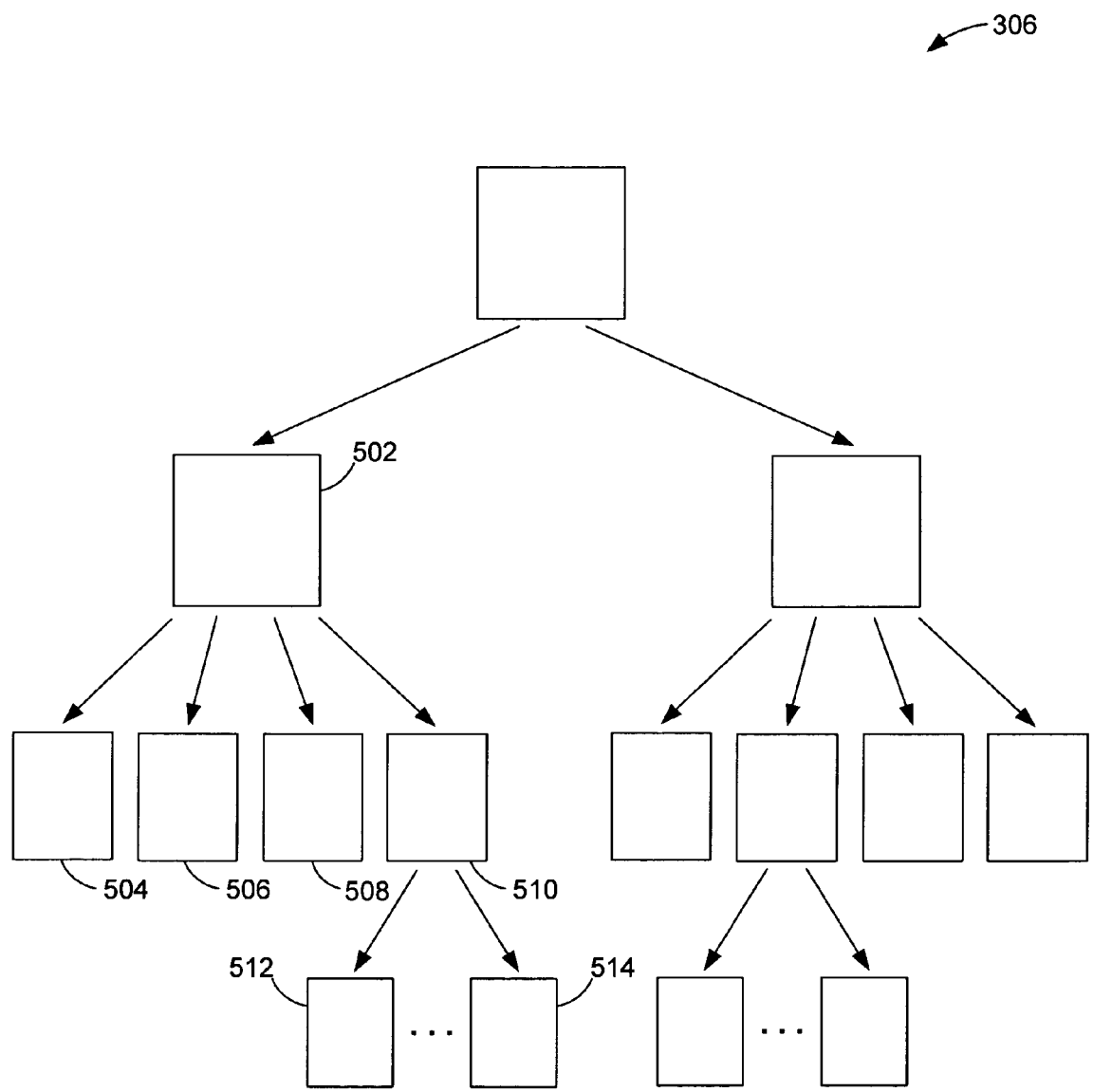
FIG. 5 illustrates an example of the data structure according to one embodiment of the present invention.

FIG. 5 illustrates an example of the data structure 306 according to one embodiment of the present invention. As shown, data structure 306 is an N-branch data structure. An N-branch data structure is a data structure where any number of branches may be associated with each entry. For example, an entry in data structure 306 may include any number of branch entries (where each branch entry may also include any number of branch entries).

Each entry in data structure 306 corresponds to a hash result. If, for example, a first entry 502 is determined, a key 402 in entry 502 is compared with a search key associated with data frame 302. If key 402 does not match the search key associated with data frame 302, another entry in one of the branches associated with entry 502 is searched for the correct entry.

As shown, entry 502 includes four branches that are connected to four different entries 504, 506, 508, and 510. Hints 406 in entry 502 are used to determine which entries 504, 506, 508, 510 should be searched next. Each hint 406 will be associated with a pointer that points to one of the entries 504, 506, 508, or 510. Although it is described that the pointers point to an entry that is in a branch of entry 502, it will be understood that any entry in data structure 306 may correspond to a pointer.

At least a portion of the search key is then compared with hints 406. If that search key portion corresponds to a hint 406, the entry corresponding to the pointer for the corresponding hint 406 is determined. For example, the pointer may point to entry 510. A key 402 is checked for entry 510 and compared with the search key associated with data frame 302. If key 402 matches the search key, an address 404 associated with entry 510 is retrieved. If key 402 does not match the search key, hints 406 in entry 510 are used to determine which entry to search next. For example, child entries 512 and 514 for entry 510 may be searched next depending on the hints 406 found in entry 510. The process then continues as described above until the correct entry is found.

Figure 6:
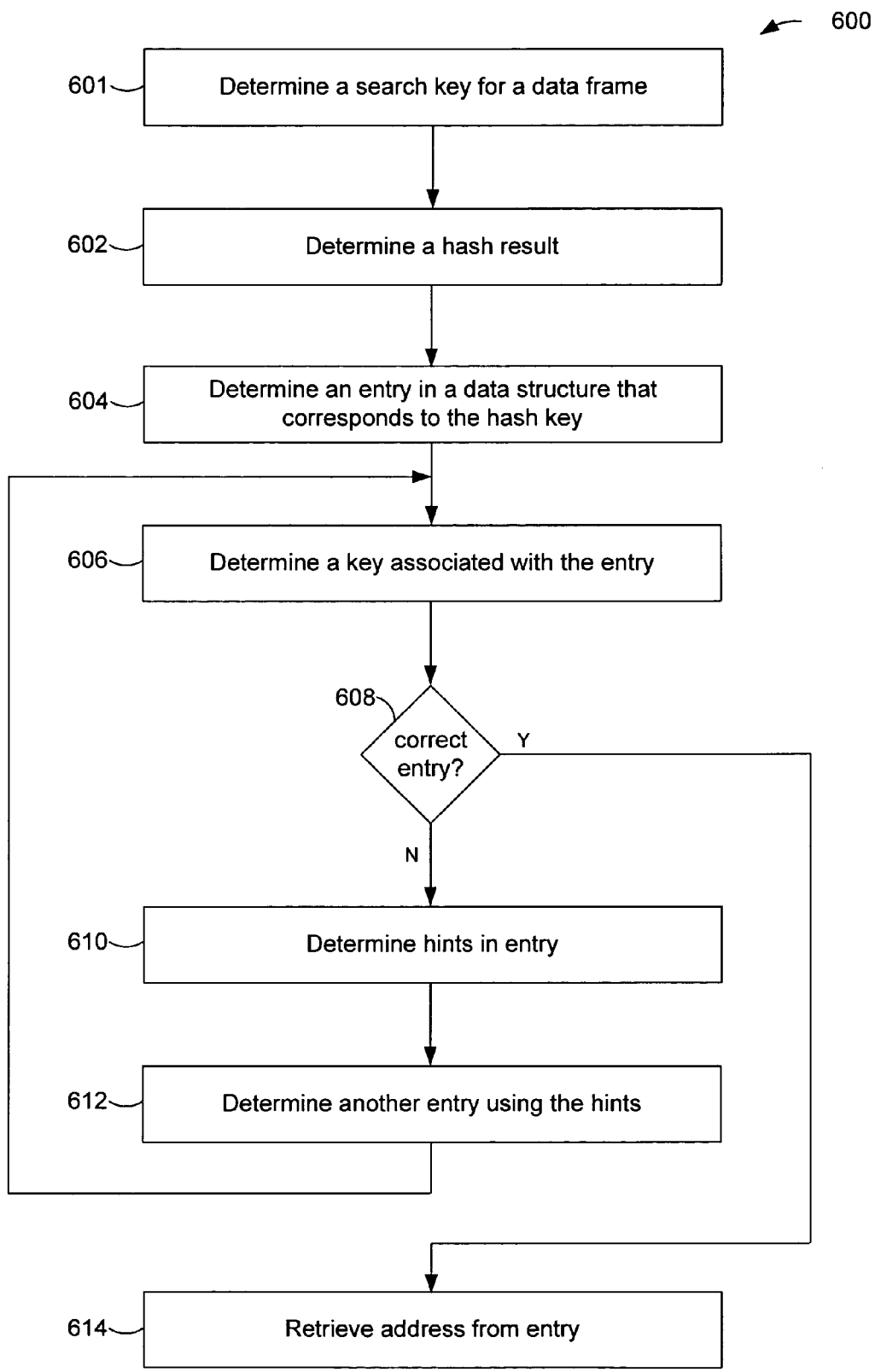
FIG. 6 depicts a simplified flowchart of a method for searching for entries using hints according to one embodiment of the present invention.

FIG. 6 depicts a simplified flowchart 600 of a method for searching for entries 400 using hints 406 according to one embodiment of the present invention. In step 601, a search key is determined for a data frame 302. In step 602, a hash result is generated using the search key. The search key is hashed using a hashing algorithm to generate the hash result.

In step 604, an entry 400 in data structure 306 that corresponds to the hash result is determined. Because larger keys are hashed into smaller keys, there may be collisions that occur. Thus, the entry is verified to determine if it is the correct entry for the search key.

In step 606, a key 402 associated with entry 400 is determined. Key 402 corresponds to an unhashed value of the hash result, which may or may not correspond to the search key determined in step 601.

In step 608, the process determines if the determined entry 400 is the correct entry for data frame 302. In one embodiment, the search key is compared to the determined key 402. If the key 402 matches the search key, then the correct entry has been found.

If the determined entry 400 is the correct entry, the process proceeds to step 614, described below.

If the entry is not the correct entry, in step 610, hints 406 associated with the entry 400 determined in step 604 are determined. Hints 406 are used to determine another entry to search for. For example, hints 406 may indicate a branch associated with the entry determined in step 604 to search in. Also, hints 406 may indicate a specific entry 400 to search for.

In step 612, another entry is determined using hints 406. The entry is then processed as described above in steps 606, 608, and 610. The above process continues until a correct entry is found (e.g., a search key matches a key 402). In one embodiment, as successive entries are determined, different information in the search key is used to determine a hint 406. For example, the first time a search key is compared with hints 400, the eight LSBs are used, the second time, the search key is shifted eight bits and the eight LSBs are used, and so on.

In step 614, when a correct entry is found, an address 406 is retrieved from the entry. Address 406, in one embodiment, is the address of a storage device 104 that information will be written, updated, or erased. Address 406 may also point to a statistics table or could indicate the destination of an element for further frame processing.

Figure 7:
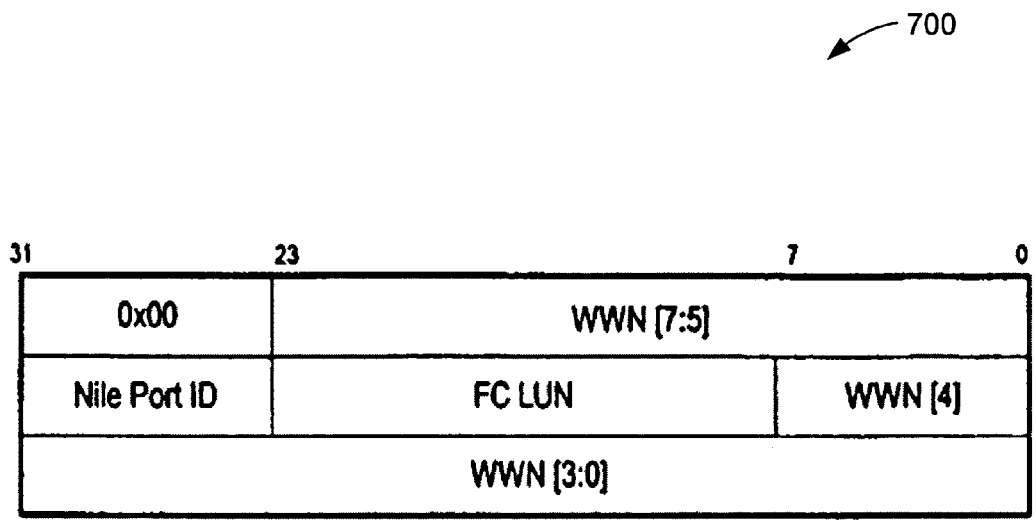
FIG. 7 illustrates an embodiment of a search key according to embodiments of the present invention.

FIG. 7 illustrates an embodiment of a search key 700 according to embodiments of the present invention. In one embodiment, search key 700 includes a worldwide name (WWN), a port ID, and a Fibre Channel Logical Unit Number (FC LUN) address.

Figure 8:
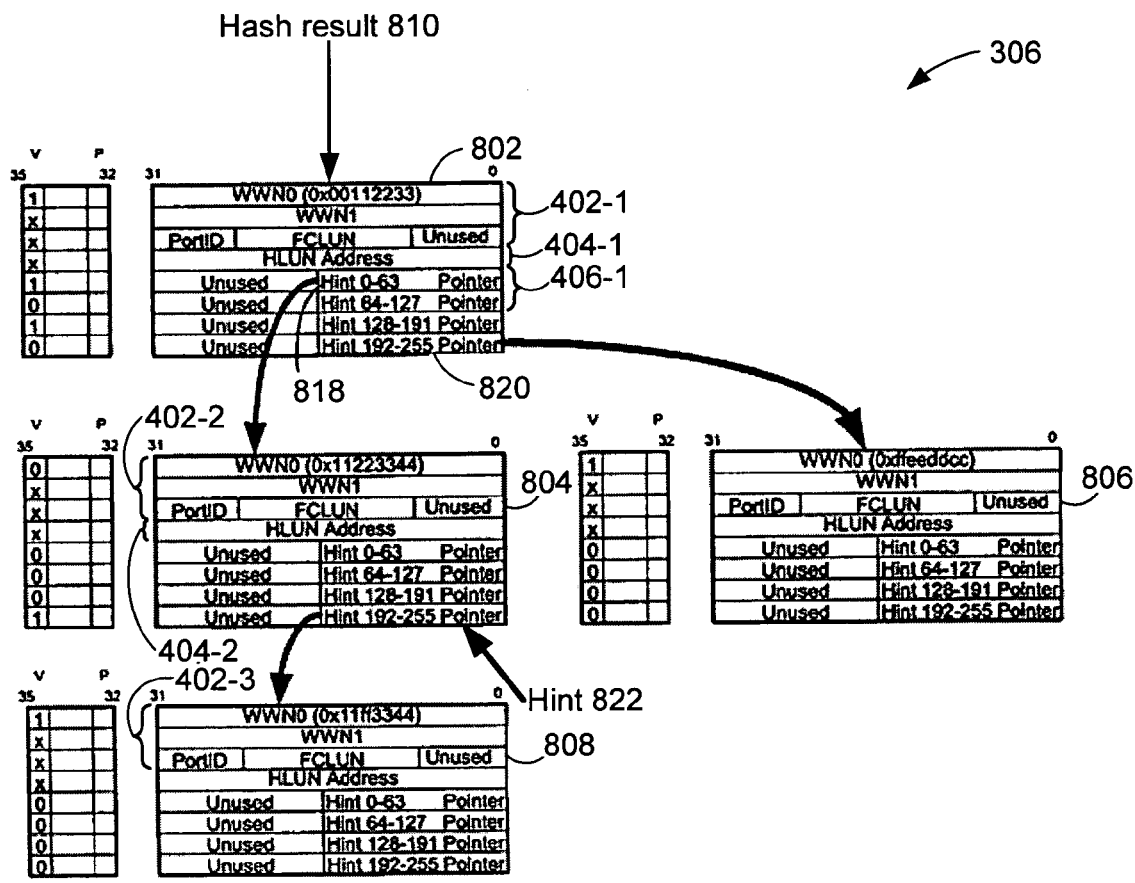
FIG. 8 illustrates an example of data structure according to one embodiment of the present invention.

FIG. 8 illustrates an example of data structure 306 according to one embodiment of the present invention. As shown, four entries are depicted as an entry 802, an entry 804, an entry 806, and an entry 808 which are included in data structure 306. It should be understood that data structure 306 may include other entries.

Search key 700 in FIG. 7 is hashed into a hash result 810. A lookup is performed on the hash result and its corresponding entry is accessed. For example, hash result 810 matches the hash result for entry 802. Entry 802 includes a key 402-1 that is compared to the search key. If key 402-1 matches search key 700, then entry 802 is the correct entry for search key 700. If this is the case, address 404-1 is retrieved.

If key 402 does not match a search key, hints 406-1 are used to search for a second entry. As shown, a first hint 818 includes a pointer to entry 804. A second hint 820 includes a pointer to entry 806. The second and third hints do not point to any entries and thus may not correspond to any entries. Although the entries corresponding to the second and third hints are not included, it should be understood that entries may also correspond to the pointers associated with the hints.

If at least a part of search key 700 includes a value between the values 0-63, then entry 804 is determined and if at least a part of search key 700 includes a value between the values of 192-255, entry 806 is determined.

If, for example the eight LSBs of search key 700 correspond to hint 818, entry 804 is accessed. A key 402-2 is compared to search key 700. If key 402-2 matches search key 700, then entry 804 is the correct entry. If entry 804 is not the correct entry, then a new hint is generated by shifting search key 700 to the right eight bits and examining the next eight LSBs. If a hint exists corresponding to the $2^{nd}$ least significant byte, that hint is used to continue the search. Hint 822 is used to determine another entry to search, in this case, entry 808.

If entry 808 is determined, a key 402-3 is compared with the search key. If key 402-3 matches search key 700, then entry 808 is the correct entry. If entry 808 is not the correct entry, then no entries in data structure 306 correspond to the search key.

If none of the entries 804-808 are the correct entries for the search key, then a null value or error may be returned indicating that an entry corresponding to search key 700 is not included in data structure 306.

Although embodiments of the present invention have been described as retrieving an address 404 from entry 400, it will be understood other actions may be performed such as updating information in entry 400 or erasing information in entry 400.

Accordingly, embodiments of the present invention provide searching techniques that use information found in entries to determine a correct entry. A search key is determined and hashed into a hash result. An entry corresponding to the hash result is accessed and it is determined if it is the correct entry for the search key. If the entry is not the correct entry, hints in the entry are used to determine another entry. The processing then continues as above until a correct entry is found.

Advantages of the above techniques include efficient search time and decreased storage space. If an N-branch search tree is used, the hints are used so that only one branch has to be searched if a collision occurs. Thus, if an entry is not the correct entry, hints will provide a pointer to a correct branch or entry in the data structure. The next entry is then checked to determine if it is the correct entry. Thus, all branches for an entry do not need to be searched to find the correct entry, thereby, decreasing search time. Also, storage space is minimized because an N-branch data structure may be used instead of a binary search tree or linearly linked list. Additionally, storage space is minimized since only storage space used is allocated.

While the present invention has been described using a particular combination of hardware and software implemented in the form of control logic, it should be recognized that other combinations of hardware and software are also within the scope of the present invention. The present invention may be implemented only in hardware, or only in software, or using combinations thereof.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope of equivalents.

What is claimed is:

1. A method for searching a data structure, the method comprising:
    hashing a search key to generate a hash result;
    determining a first entry in a plurality of entries in the data structure using the hash result;
    determining if the first entry corresponds to the search key;
    if the first entry does not correspond to the search key, using information in the first entry to determine a second entry in the data structure, the second entry included in a branch of a plurality of branches associated with the first entry;
    if the first entry does correspond to the search key, performing an action on information stored in the first entry.

2. The method of claim 1, further comprising:
    determining if the second entry corresponds to the search key; and
    if the second entry does not correspond to the search key, using information in the second entry to determine a third entry in the data structure, the third entry included in a branch of a plurality of branches associated with the second entry.

3. The method of claim 2, further comprising if the second entry does correspond to the search key, performing an action associated with the second entry.

4. The method of claim 2, wherein using the information in the first entry to determine the second entry comprises comparing the information in the first entry to at least a first part of the search key to determine if the information in the first entry matches the at least the first part of the search key.

5. The method of claim 4, wherein using the information in the second entry to determine the third entry comprises comparing the information in the second entry to at least a second part of the search key to determine if the information in the second entry matches the at least the second part of the search key, the at least the second part of the search key being different than the at least a first part of the search key.

6. The method of claim 1, wherein determining if the first entry corresponds to the search key comprises comparing an entry key in the entry to the search key to determine if the first entry matches to the search key.

7. The method of claim 1, wherein the information is used to determine which branch in the plurality of branches associated with the first entry to search in for the second entry.

8. The method of claim 1, wherein performing the action comprises at least one of retrieving information from the first entry, updating information in the first entry, and deleting information in the first entry.

9. The method of claim 1, wherein the information comprises a plurality of hints, wherein a hint in the plurality of hints corresponds to information associated with the search key and points to the second entry.

10. The method of claim 9, wherein each hint is associated with a branch in the plurality of branches associated with the first entry.

11. A method for searching a data structure, the method comprising:
    (a) hashing a search key to generate a hash result;
    (b) determining an entry in a plurality of entries in the data structure using the hash result;
    (c) determining if an entry key in the entry corresponds to the search key;
    (d) if the entry key does not correspond to the search key, repeating step (c) using a subsequent entry until the entry key from the subsequent entry corresponds to the search key, wherein the subsequent entry is determined using information in the entry, wherein as step (c) is repeated using a first subsequent entry and a second subsequent entry, different information in the search key is used to determine the second subsequent entry than was used in determining the first subsequent entry; and
    (e) if the entry key does correspond to the search key, performing an action on information stored in the entry.

12. The method of claim 11, wherein the subsequent entry is determined by comparing information in the search key to information in the entry to determine if the information in the search key matches the information in the entry.

13. The method of claim 11, wherein performing the action comprises at least one of retrieving information from the first entry, updating information in the first entry, and deleting information in the first entry.

14. The method of claim 11, wherein the information comprises a plurality of hints, wherein a hint in the plurality of hints corresponds to information associated with the key and points to the subsequent entry.

15. The method of claim 14, wherein each hint is associated with a branch in one or more branches associated with the entry.

16. A method for searching for an entry in a plurality of entries in a data structure, the method comprising:
    receiving a data frame from a storage network;
    determining a search key for the data structure using information in the data frame;
    hashing the search key to generate a hash result;
    determining a first entry in the plurality of entries corresponding to the hash result;
    determining if the first entry corresponds to the search key;
    if the first entry does not correspond to the search key, comparing information in the first entry with a first part of the search key to determine a second entry in the data structure, the second entry included in a branch of a plurality of branches associated with the first entry; and
    if the first entry corresponds to the search key, retrieving an address for a storage device found in the first entry.

17. The method of claim 16, further comprising:
    determining if the second entry corresponds to the search key; and
    if the second entry does not correspond to the key, comparing information in the second entry with a second part of the search key to determine a third entry in the data structure, the third entry included in a branch of a plurality of branches associated with the second entry.

18. The method of claim 17, further comprising writing the address to the data frame, wherein the address is used to perform an action with the storage device at the address.

19. The method of claim 18, wherein the action comprising at least one of writing, erasing, and updating information at the address in the storage device using information in the data frame.

20. A machine-readable medium having instructions which, when executed, cause a machine to perform a process, the process comprising:
    (a) hashing a search key to generate a hash result;
    (b) determining an entry in a plurality of entries in the data structure using the hash result;
    (c) determining if an entry key in the entry corresponds to the search key;

(d) if the entry key does not correspond to the search key, repeating step (c) using a subsequent entry until the entry key from the subsequent entry corresponds to the search key, wherein the subsequent entry is determined using information in the entry, wherein as step (c) is repeated using a first subsequent entry and a second subsequent entry, different information in the search key is used to determine the second subsequent entry than was used in determining the first subsequent entry; and (e) if the entry key does correspond to the search key, performing an action associated with the entry.

21. The machine-readable medium of claim 20, wherein the subsequent entry is determined by comparing information in the search key to information in the entry to determine if the information in the search key matches the information in the entry.

22. The machine-readable medium of claim 20, wherein performing the action comprises at least one of retrieving information from the first entry, updating information in the first entry, and deleting information in the first entry.

23. The machine-readable medium of claim 20, wherein the information comprises a plurality of hints, wherein a hint in the plurality of hints corresponds to information associated with the key and points to the subsequent entry.

24. The machine-readable medium of claim 23, wherein each hint is associated with a branch in one or more branches associated with the entry.

* * * * *